United States Patent [19]

Wexler

[11] Patent Number: 4,811,197
[45] Date of Patent: Mar. 7, 1989

[54] ELECTROSTATIC DUST COLLECTOR SYSTEM

[75] Inventor: Ira M. Wexler, Randallstown, Md.

[73] Assignee: Environmental Elements Corp., Baltimore, Md.

[21] Appl. No.: 93,542

[22] Filed: Sep. 2, 1987

[51] Int. Cl.$^4$ .......................... G05B 13/02; B03C 3/68
[52] U.S. Cl. ..................................... 364/148; 364/131; 55/105; 55/101
[58] Field of Search ............... 364/148, 149, 131, 133, 364/200, 480, 900; 55/105, 130, 101; 323/903

[56]  References Cited

U.S. PATENT DOCUMENTS

| | | | |
|---|---|---|---|
| 4,326,860 | 4/1982 | Laugesen | 55/105 |
| 4,417,336 | 11/1983 | Weilbacker | 364/900 |
| 4,432,061 | 2/1984 | Herklotz et al. | 364/480 |
| 4,521,228 | 6/1985 | Daar et al. | 55/105 |

*Primary Examiner*—Jerry Smith
*Assistant Examiner*—Paul Gordon

*Attorney, Agent, or Firm*—Morton J. Rosenberg

[57] ABSTRACT

An electrostatic dust collection system (100) includes adaptive control system (10) for substantially maximizing performance of the electrostatic dust collection system (100). Adaptive control system (10) includes dual processor control unit (14) which has the capability to learn new system operating parameters in response to feedback signals from the high voltage transformer/rectifier (70). The self learning feature is implemented with a dual memory architecture coupled to main processor (300). A first non-volatile memory unit (320) holds predetermined system operating parameters for initial use by the adaptive control system (10). The second memory unit (310) is an electrically alterable non-volatile memory unit which is used to store new system operating parameters which have been computed to substantially improve system performance, as determined by measurements of the feedback signals from the high voltage transformer/rectifier (70).

31 Claims, 8 Drawing Sheets

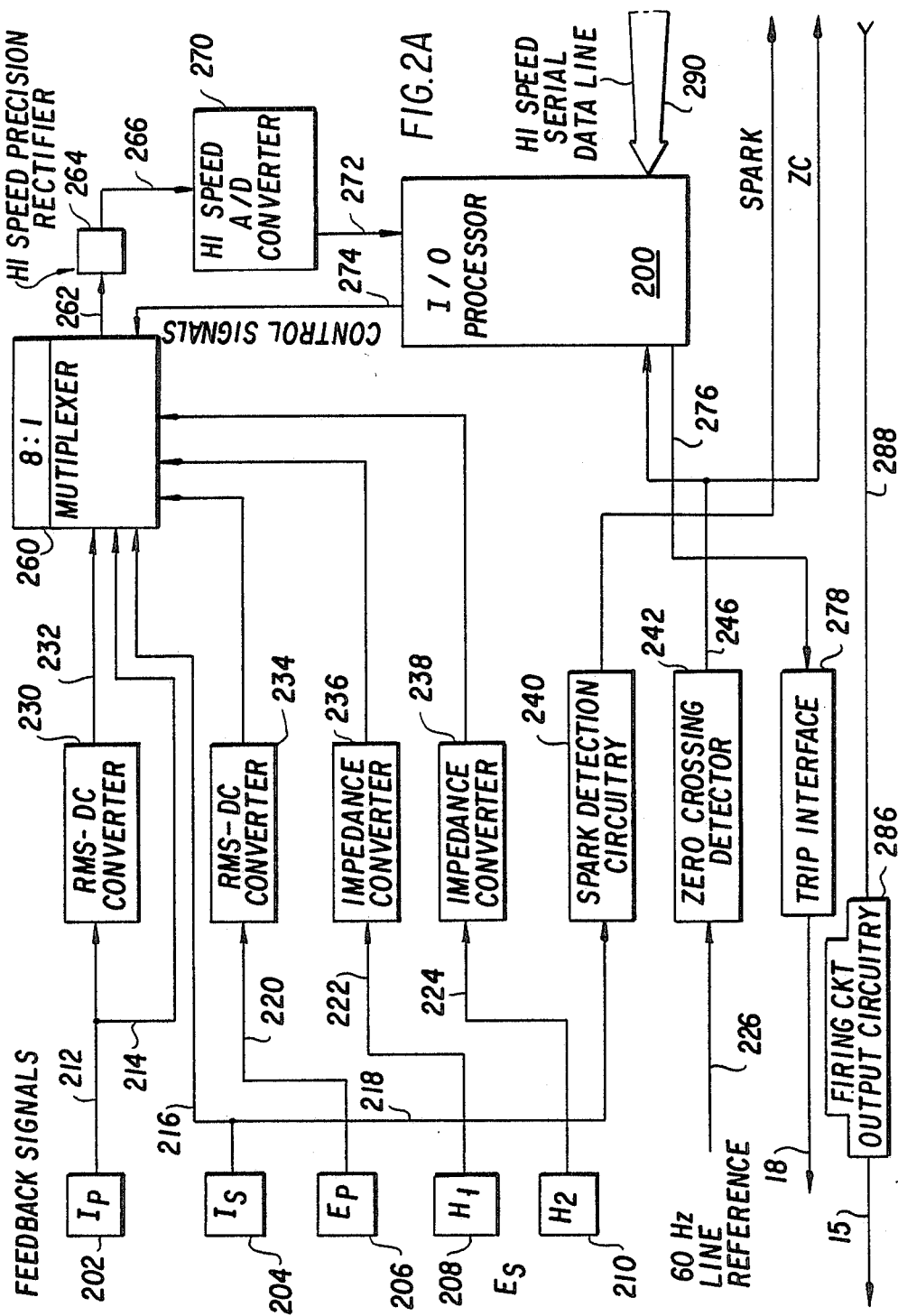

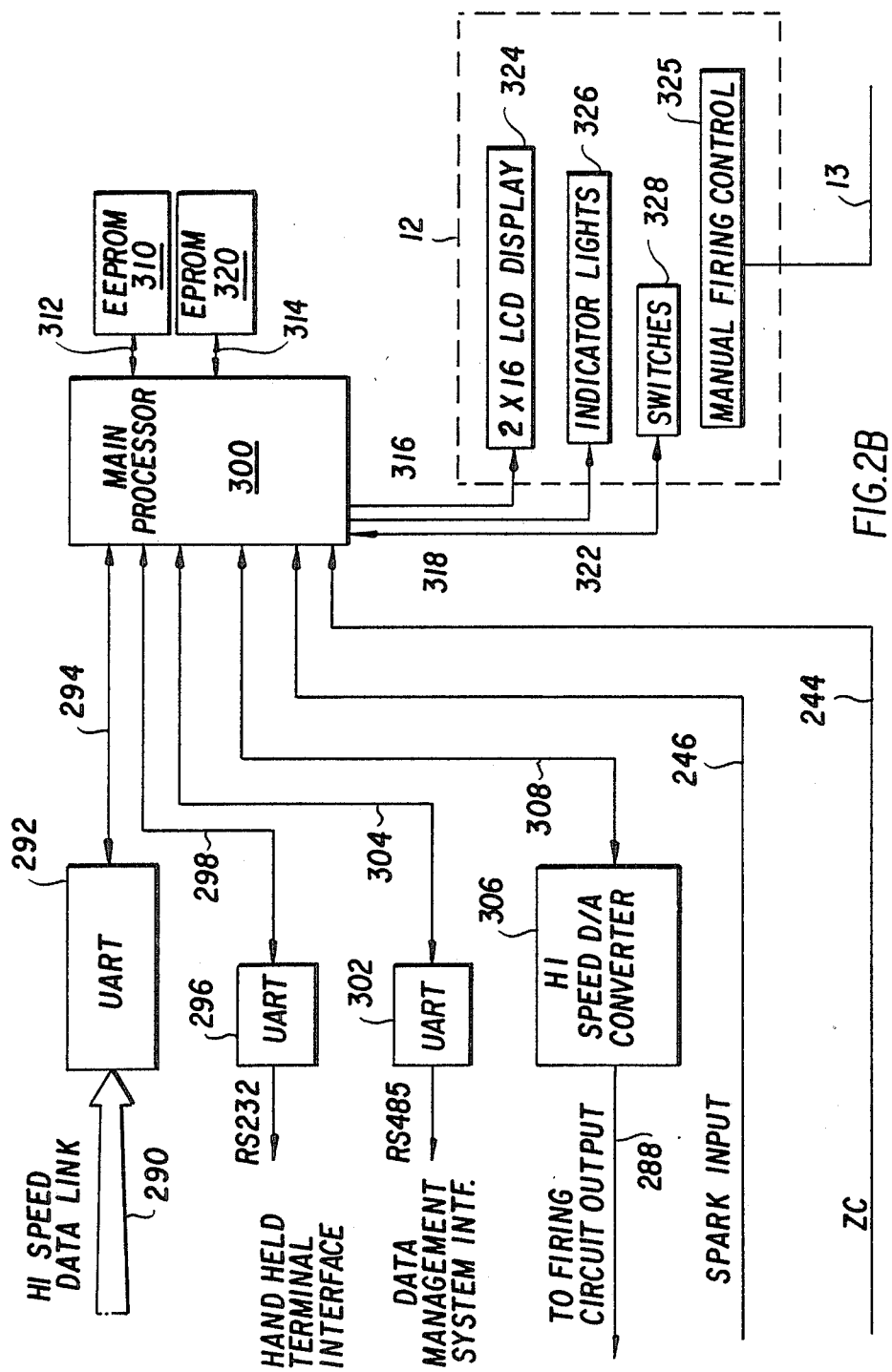

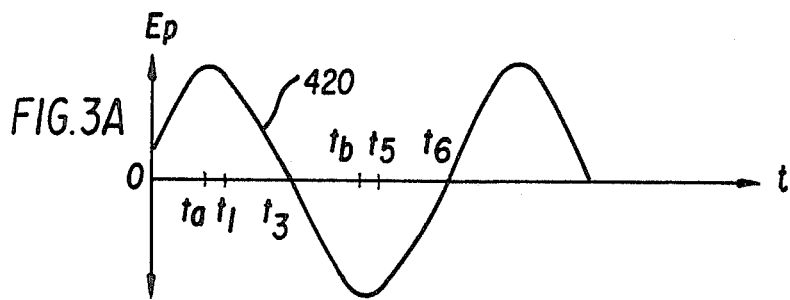
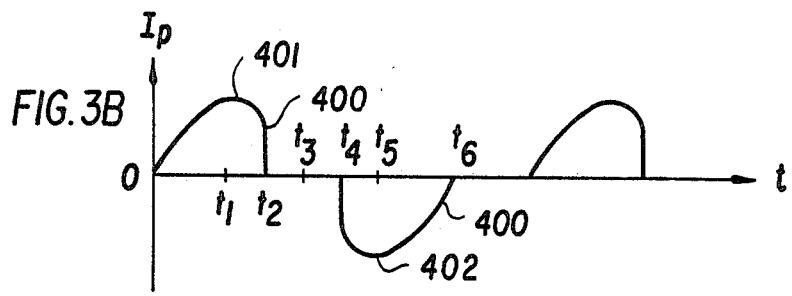
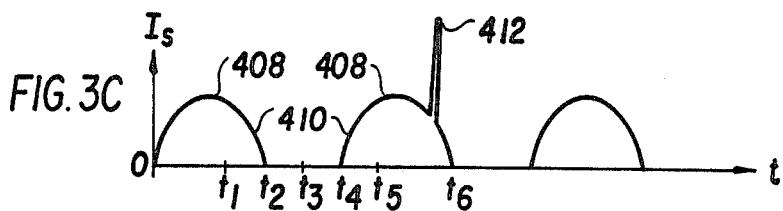
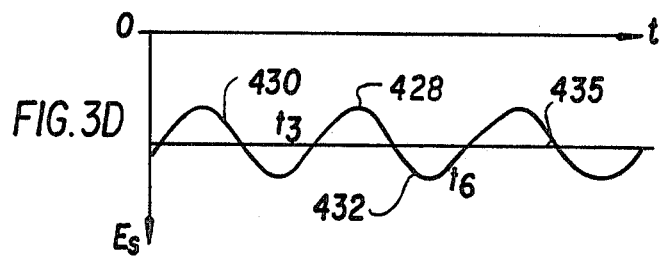
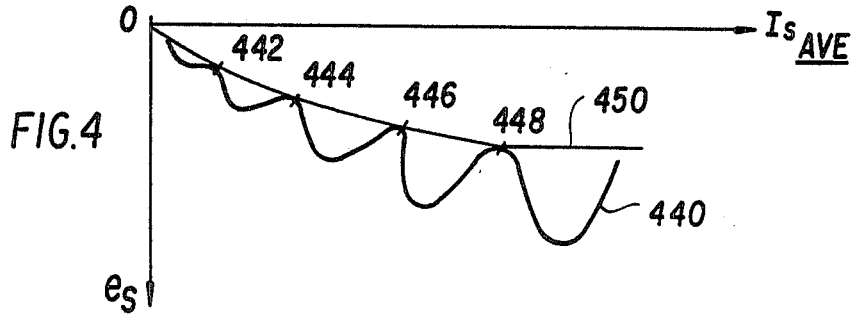

ELECTROSTATIC DUST COLLECTOR SYSTEM

A Microfiche Appendix is included in this Application containing two (2) microfiche. The first microfiche is entitled "Dig 102 Main Proc." containing sixty-seven (67) frames plus one (1) test target frame for a total of sixty-eight (68) frames. The second microfiche is entitled "IOP110 I/O Processor Run Version" containing thirty-one (31) frames plus one (1) test target frame for a total of thirty-two (32) frames.

BACKGROUND OF THE INVENTION

1. Field of the Invention

This invention is directed to an electrostatic dust collection system. In particular, this invention relates to electrostatic dust collection systems having an adaptive control system for adjusting system parameters responsive to feedback signals from the system. More in particular, this invention relates to an electrostatic dust collection system which includes a dual processor control for performing high speed measurements of signal parameters of the feedback signals, and utilizing those measurements to establish new system operating parameters to substantially maximize performance of the electrostatic dust collection system. Still further, this invention directs itself to an electrostatic dust collection system where the dual processor control of the adaptive control system includes a first processor to manage input and output functions, and a second processor to establish the adaptive control function. Still further, this invention relates to an electrostatic dust collection system having a dual memory architecture coupled to the second processor for storing initial system operating parameters and subsequently calculated new system operating parameters to substantially improve performance of the electrostatic dust collection system. Additionally, this invention pertains to an electrostatic dust collection system which has an adaptive control system with a non-volatile dual memory system where at least one of the non-volatile memory units is electrically alterable.

2. Prior Art

Electrostatic dust collection systems which include microprocessor control systems are known in the art. Electrostatic dust collection systems whose microprocessor control systems use measurements of feedback signals from the transformer/rectifier to adjust system operation are also known in the art. However, in some prior art electrostatic dust collection systems, no provision is made to learn new system operating parameters calculated from measurements of the feedback signals from the transformer/rectifier. Thus, in such prior art electrostatic dust collection systems, when new system operating parameters are calculated, they are not retained subsequent to the removal of power from the electrostatic dust collection system.

In other prior art electrostatic dust collection systems, measurement of feedback signals from the high voltage transformer/rectifier to determine fault conditions provide a slow response. Such measurements made by prior art electrostatic dust collection systems can take five to six cycles of the input AC frequency before a response can be initiated. In contradiction, the subject electrostatic dust collection system makes use of high speed measurement techniques which permit response to a fault condition in one cycle of the input AC frequency.

SUMMARY OF THE INVENTION

An electrostatic dust collection system which includes a dual microprocessor control for controlling the operating parameters of the electrostatic dust collection system and adapts those operating parameters in response to the current operating conditions of the system. The dual processor control includes an input/output processor for control of the input/output functions, including the measurement of feedback signals from the electrostatic dust collection system. Having a processor dedicated to the input/output function achieves a substantially high speed response to changes in the operating system conditions of the electrostatic dust collection system. The input/output processor also includes a high speed data link for transmission of the signal measurements to the main processor.

The main processor has the provision to adaptively control the electrostatic dust collection system in response to the measurements provided by the input/output processor. The ability to adapt the system operating parameters to maximize the dust precipitator system performance relative to the operating conditions of the dust precipitator, is facilitated by a unique memory architecture consisting of two distinct nonvolatile memory units.

The dual processor control system also has provision for manual operation, however, even during manual operation, the input/output processor continues to measure the feedback signals. During manual operation, the main processor transmits the measurements of the feedback signals provided from the input/output processor to a display unit to provide the operator with an indication of the system's operating conditions.

BRIEF DESCRIPTION OF THE DRAWINGS

FIG. 2A is a partial block diagram of the input/output portion of the adaptive control system portion of the electrostatic dust collection system shown in FIG. 1;

FIG. 2B is a partial block diagram of the manual control and display unit and the main processor portion of the adaptive control system included in the electrostatic dust collection system shown in FIG. 1;

FIG. 3A is a waveform signal diagram of the primary voltage applied to the electrostatic dust collection system of FIG. 1;

FIG. 3B is a waveform signal diagram for the primary current seen in the electrostatic dust collection system of FIG. 1;

FIG. 3C is a waveform signal diagram for the secondary current seen in the electrostatic dust collection system of FIG. 1;

FIG. 3D is a signal waveform diagram of the secondary voltage seen in the electrostatic dust collection system of FIG. 1;

FIG. 4 is a graphical representation of the secondary voltage increased with respect to the increase in secondary current;

DESCRIPTION OF THE PREFERRED EMBODIMENTS

Figure 1:
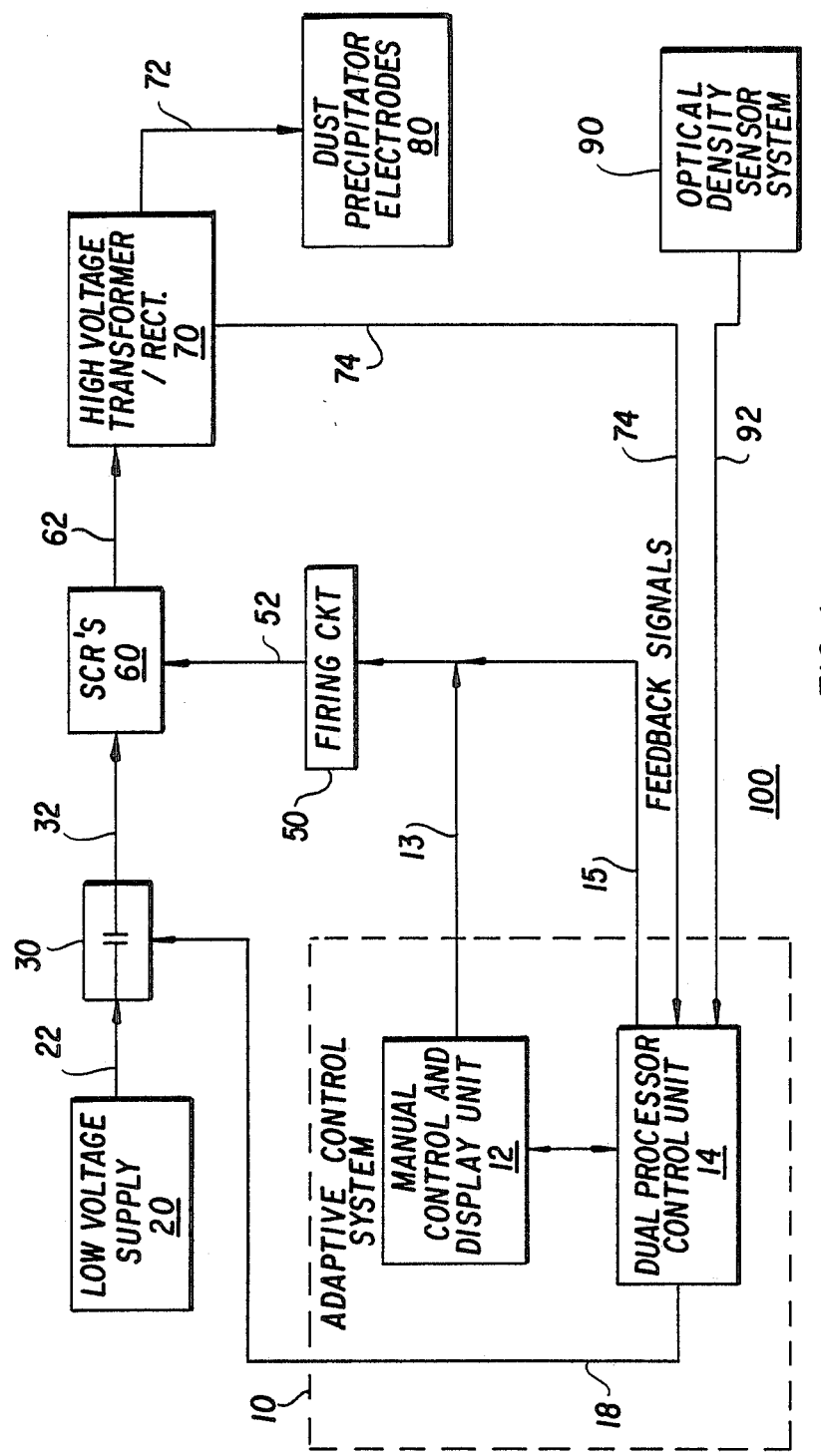
FIG. 1 is an overall block diagram of the electrostatic dust collection system.

Referring now to FIG. 1, there is shown electrostatic dust collection system 100 including dual processor control 10 for adaptively controlling the operation of the dust precipitator 80 in response to feedback signals from the high voltage transformer/rectifier 70. Dust precipitator 80 is a high voltage direct current ionization type dust collector which is well-known in the art.

In general overall concept, electrostatic dust collection system 100 provides an adaptive control system 10 for changing system 100 operating parameters in response to feedback signals from the high voltage transformer/rectifier 70. The adaptive control system 10 transmits control signals to the firing circuit 50 in response to the dust precipitator performance as measured by optical density sensor system 90, as is typical of prior art dust collector system controls. However, the adaptive control system 10 includes dual processor control unit 14 which measures key parameters of particular feedback signals from the high voltage transformer/rectifier 70, and modifies the control signals transmitted to firing circuit 50 as required in order to substantially maximize the performance of dust collection system 100. The changed parameters generated by dual processor control unit 14 are retained in a non-volatile storage for continued use in controlling the operation of system 100, even after a complete powering down of the system.

Referring further to FIG. 1, there is shown electrostatic dust collection system 100 having low voltage power supply 20. Low voltage power supply 20 provides conventional single-phase, 480 volt, 60 Hz AC power to system 100. The input power is coupled to a remotely operated contactor 30 by line 22. From remotely operated contactor 30, the input power is coupled to an electronic switch in the form of silicon controlled rectifiers (SCR) 60 by line 32. When the SCRs 60 are switched on, by methods to be described in the following paragraphs, the input power is transmitted to the high voltage transformer/rectifier unit 70 by line 62. High voltage transformer/rectifier 70 converts the 480 volt AC input to a high voltage direct current which is transmitted to the dust precipitator electrodes 80 by line 72. The high voltage produced by high voltage transformer/rectifier 70 has an approximate magnitude of 0.0 to 80,000 volts which is provided to the dust precipitator electrodes 80 in the form of direct current pulses.

Optical density sensor system 90 includes its own data management system and provides a measure of the dust precipitator performance to adaptive control system 10 by means of a control signal transmitted on line 92. Dual processor control unit 14 of adaptive control system 10 provides control signals to firing circuit 50 over line 15. When the signals transmitted from optical density sensor system 90 indicate that the level of dust in the effluent air stream is below a predetermined level, dual processor control unit 14 reduces the input power to the dust precipitator electrodes 80. As is well known in this art, the input power is controlled by controlling the switching characteristics of the SCR unit 60.

The switching characteristics of the SCR unit 60 are responsive to the gate control signals coupled to SCR unit 60, from firing circuit 50, on line 52. The gate control signal output from firing circuit 50 is proportional to a control current signal from either manual control and display unit 12 on line 13, or dual processor control unit 14 on line 15.

An important operating parameter for high voltage dust collection systems of this type is the rate at which the input voltage to the dust precipitator electrodes 80 is increased. Another important parameter is the system's response to high voltage arcing in dust precipitator 80 and the back corona phenomenon. These operating parameters have been predetermined to provide reasonable operation over a wide range of conditions. Adaptive control system 10 of system 100 provides a means to learn new operating parameters which substantially maximize system 100 performance in a particular operating environment.

To accomplish the performance improvements, adaptive control system 10 utilizes a dual processor control unit 14 for measuring predetermined characteristics of feedback signals from the high voltage transformer/rectifier 70, and uses those measurements alone, or in combination with the output from optical density sensor system 90 to calculate new operating parameters for improved system performance. The new system operating parameters are stored in a non-volatile memory, to be more fully described in following paragraphs, so that upon re-initialization of control system 10, the operating parameters used for control of system 100 will be that which was previously calculated to provide improved performance. Thus, the adaptive control system 10 provides a means to learn new system operating parameters as a function of the actual operating conditions of the dust collection system 100.

As will be described in following paragraphs, adaptive control system 10 also provides a substantially high speed response to fault conditions, and thus prevents potentially serious damage to the components of electrostatic dust collection system 100. The dual processor control unit 14 is coupled to remotely operated breaker 30 by control line 18, providing the means to electrically disconnect system 100 from the input power supply 20. Adaptive control system 10 further includes manual control and display unit 12 for manually controlling the switching of SCR unit 60 while still displaying selected measurements of the feedback signals from high voltage transformer/rectifier 70.

Manual control and display unit 12 outputs a control current signal on line 13 to firing circuit 50. Firing circuit 50 converts the control current signal from either manual control and display unit 12 or dual processor control unit 14 to the analog gate control signals required to operate the SCRs in SCR unit 60.

Referring now to FIGS. 2A and 2B, there is shown an overall system block diagram of adaptive control system 10 which includes a dual processor network for providing high speed adaptive control of dust collection system 100. The main processor 300 manages the overall system operation providing the firing circuit control signals and determining the best possible operating parameters. The input/output processor 200 operating in parallel with the main processor 300, controls the measurement of predetermined characteristics of the feedback signals from high voltage transformer/rectifier 70.

As shown in FIG. 2A, input/output processor 200 includes high speed serial data link 290 for communication with the main processor 300 shown in FIG. 2B. The input/output processor 200 sequentially measures predetermined characteristics of the feedback signals received on input terminals 202, 204, 206, 208, and 210 and transmits those measured values over the high speed serial data link 290 to main processor 300 in response to control signals previously transmitted from main processor 300 to input/output processor 200 over the high speed serial data link 290.

Input/output processor 200 also functions to monitor the measured values obtained from the feedback signal to detect fault conditions and initiate a response thereto. Input/output processor 200 in response to a fault transmits control signals on line 276 to trip control interface 278 which converts the logic level control signal on line 276 to the voltage level required to operate contactor 30.

The dual processor architecture in combination with high speed measurement techniques makes possible the high speed response of control system 10 to fault conditions. The primary voltage and current are the best indications of a fault condition, but because of their non-symmetrical waveforms, it has heretofore been difficult to achieve an accurate measurement in less than 6-8 cycles of the AC signal. The adaptive control system 10 makes use of a true RMS to DC converter 230, 234 adapted for measuring the primary current and voltage respectively in one half of an AC cycle. The true RMS to DC converter 230, 234 may be a commercially available Analog Devices integrated circuit having the designation AD536, which is operated on a measurement cycle of approximately 8.3 milliseconds.

The primary current feedback signal is coupled from terminal 202 to true RMS to DC converter 230 by coupling line 212. The output from true RMS to DC converter 230 is coupled by line 232 to multiplexer 260. Similarly, the primary voltage feedback signal is input to terminal 206, from which it is coupled to true RMS to DC converter 234 by coupling line 220. The output from true RMS to DC converter 234 is coupled by line 252 to multiplexer 260.

The output signal provided on lines 232 and 252 resulting from the measurements made during one half cycle of the AC signal is composed of a DC value with a large AC component. The large AC component is a source of error which has been handled by prior art systems by increasing the measurement cycle of similar true RMS to DC converters to a period of six to eight AC cycles.

The adaptive control system 10, herein disclosed, improves the accuracy of the true RMS measurement made over one half an AC cycle through the use of a software algorithm, resident in input/output processor 200, to average out the AC ripple and respond to calculated values outside predetermined limits, within the next half cycle of the AC waveform.

Thus, adaptive control system 10 can respond to a fault condition within approximately 16.66 milliseconds.

Subsequent to identifying a fault condition, input/output processor 200 outputs a trip control signal on line 276 to trip interface 278. Trip interface 278 converts the logic level signal input on line 276 to the level required to operate contactor 30, shown in FIG. 1. Trip interface 278 is coupled to contactor 30 by coupling line 18.

The primary current feedback signal input at terminal 202 is also coupled directly to multiplexer 260 by line 214. The secondary current feedback signal is coupled from terminal 204 to multiplexer 260 by line 216 and to spark detection circuitry 240 by line 218. The secondary voltage is coupled to multiplexer 260 by lines 250 and 248 subsequent to impedance conversion by impedance converters 236 and 238, respectively. The high voltage high impedance feedback signals at terminals 208 and 210 are coupled to impedance converters 236 and 238 by coupling lines 222 and 224, respectively. Impedance converters 236 and 238 convert the high voltage high impedance feedback signals to the low voltage low impedance signals required to interface with multiplexer 260.

Responsive to control signals coupled from input/output processor 200 to multiplexer 260 on line 274, multiplexer 260 sequentially switches each of its inputs to output line 262 for coupling to high speed precision rectifier 264. High speed precision rectifier 264 outputs the absolute value of the signal input on line 262 to high speed A/D converter 270 on line 266. High speed A/D converter 270 is also coupled to control signal line 274 and converts each of the measurements sequentially to a digital value for input to input/output processor 200 on coupling line 272. High speed A/D converter 270 may be a commercially available circuit from Analog Devices, having the designation AD673.

Thus, input/output processor 200 controls the switching of multiplexer 260 from one input feedback signal to another and the subsequent conversion to a digital signal by high speed A/D converter 270, responsive to a control signal output on line 274 by input/output processor 200. Multiplexer 260 may be a commercially available integrated circuit available from Precision Monolithics and having the designation MUX08. Input/output processor 200 processes the input data to provide accurate measurements of such signal characteristics as the average, the peak or the RMS value for any of the input feedback signals. Input/output processor 200 transmits the processed values to main processor 300 over the high speed data link 290. Input/output processor 200 may be a commercially available microprocessor available from Hitachi Corporation, and having the designation 6301VOP.

The measurements controlled by input/output processor 200, are timed with respect to the 60 Hz line frequency. A reference pulse input is provided by a conventional zero crossing detector circuit 242 which outputs a pulse reference signal on line 244 to input/output processor 200 responsive to a 60 Hz line reference signal input on line 226.

The secondary current feedback signal coupled to terminal 204 is coupled by line 218 to spark detection circuitry 240. Spark detection circuitry 240 identifies a spark by the characteristic short duration high current spike superimposed on the secondary current, and outputs a logic level indication of a detected spark on line 246 to main processor 300. Main processor 300 is programmed to change the firing circuit operating parameters output on line 308 of FIG. 2B in response to the frequency of spark occurrence exceeding a manually entered predetermined value, as will be explained in following paragraphs.

Referring further to FIG. 2B, there is shown universal asynchronous receiver-transmitter (UART) 292 coupled to high speed serial data link 290 for interface between the serial communications from input/output processor 200 and the parallel input to main processor 300 represented by line 294 coupled between main processor 300 and UART 292. Two additional UARTs are provided for interfacing main processor 300 with other elements of electrostatic dust collection system 100. UART 296 coupled to main processor 300 by line 298 provides an interface for a remote hand-held terminal which supplements a portion of the manual control and display unit 12. UART 302 coupled to main processor 300 by line 304 interfaces control system 10 with the optical density sensor system 90, whose data provides an indication of the performance of system 100. UART 292, 296 and 302 may be commercially available integrated circuits from Hitachi Corporation, having the designation 6350.

Main processor 300 may be a commercially available 8-bit microprocessor available from Motorola Semiconductor, Inc., having a designation MC6809. Output control signals to the firing circuit 50 of system 100 is provided by means of high speed digital to analog (D/A) converter 306 which is coupled to main processor 300 by line 308. High speed D/A converter 306 converts the logic level input from main processor 300 to an analog voltage output by techniques well known in the art. High speed digital to analog converter 306 may be a commercially available device from Analog Devices, and has the designation of AD667.

The converted output from high speed D/A converter 306 is coupled to firing circuit interface 286 by line 288. Firing circuit interface 286 converts the voltage input from high speed D/A converter 306 to a control current signal for input to firing circuit 50 on coupling line 15. The control current is proportional to the power to be delivered to the dust precipitator electrodes 80, shown in FIG. 1, as determined by main processor 300.

Important to the inventive concept of adaptive control system 10, is the memory architecture provided for main processor 300. A first memory unit 320 is coupled to main processor 300 by line 314. A second memory unit 310 is coupled to main processor 300 by line 312.

First and second memory units 320 and 310 respectively, provide the means for learning new system parameters, to substantially improve system performance, relative to the feedback signal measurements provided by input/output processor 200.

First memory unit 320 is a non-volatile type memory device which can be implemented with such devices as: read only memory devices; electrically programmable read only memory devices; and, random access memory devices with a battery back-up system. Second memory unit 310 is also a non-volatile type memory device, however, it must be electrically alterable for storing new system parameter values. Second memory unit 310 can be constructed using electrically alterable read only memory devices or random access memory devices with a battery back-up system.

First memory unit 320 provides the permanent storage for the operating algorithms which control main processor 300. First memory unit 320 also stores the predetermined operating parameter values which will initially be used by adaptive control system 10. Second memory unit 310 provides an alterable non-volatile means for storage of the system operating parameter values as supplied from first memory unit 320, or as modified by main processor 300 to substantially maximize system 100 performance as determined from the measurements of the feedback signals previously described. This unique memory architecture permits adaptive control system 10 to learn new system operating parameter values as a function of the current operating conditions.

Key system operating parameter values which can be adapted to the current operating conditions by adaptive control system 10 are the ramp rate of the control current signal provided to firing circuit 50, and the kickdown voltage level at which the system will operate following the occurrence of a spark. Adaptive control system 10 adjusts the ramp rate and kickdown voltage to maintain a manually preset spark rate. Adaptive control system 10 monitors the spark rate over an interval which can be varied over an approximate range of 6.0 to 24.0 seconds, adjusting the kickdown voltage level and ramp rate to maintain the preset spark rate. The high speed measurement techniques provided by the dual processor configuration of adaptive control system 10 permits the minimum value of the secondary voltage AC ripple to be measured and compared with changes in the secondary current for determining the occurrence of back corona, and subsequently halt the rise of the firing circuit control current, should this condition occur.

Manual control and display unit 12 includes a 32-character liquid crystal display 324, indicator status lights 326, control switches 328, and manual firing controls 325. The liquid crystal display 324 is coupled to main processor 300 by coupling line 316. LCD display 324 provides a means for displaying the measured values of the feedback signals being monitored by adaptive control system 10 and for displaying status messages or prompts to an operator of electrostatic dust collection system 100. The indicator status lights 326 are coupled to main processor 300 by coupling line 318, and provide a visual indication of system status and alarm conditions. Control switches 328 are coupled to main processor 300 by coupling line 322, providing a means for manual input of selected predetermined functions to dual processor control unit 14. Manual firing controls 325 are coupled to firing circuit 50 by coupling line 13, as has been previously described, for manually providing a control current signal to operate the SCR's through firing circuit 50.

Referring now to FIG. 3A, there is shown a waveform signal diagram of the primary voltage $E_p$. The voltage waveform 420 is a typical sinusoid having a positive peak at time $t_a$, a negative peak at time $t_b$, and the period of $t_6$. Since the primary voltage has a frequency of 60 Hz, the period represented by $t_6$ is equal to approximately 16.66 milliseconds.

Referring now to FIG. 3B, there is shown the waveform signal diagram for the primary current $I_p$ represented by the waveform 400. The primary current waveform 400 has a positive going peak amplitude 401 at time $t_1$, and a negative going peak amplitude 402 at time $t_5$. As shown, the peak amplitudes of the current waveform 400 lags the peak amplitude of the primary voltage 420 as would be expected in a system of this type with an inductive load. The primary current waveform 400 has a 0.0 value from time $t_2$ to $t_4$, which indicates the time period for which the SCRs are switched off and therefore, not conducting. In addition to the measurement of the true RMS value by means previously described, the peak values 401 and 402 are measured by input/output processor 200 which samples the primary current input to multiplexer 260 on line 214 sixteen times every half cycle.

As shown in FIG. 3C, the secondary current $I_s$ is represented by the waveform 410 having peak amplitude 408 occurring at time $t_1$ and time $t_5$. As would be expected, the peak amplitude 408 of the secondary current waveform 410 occur at times which coincide with the peak amplitudes 401 and 402 of the primary current waveform 400, shown in FIG. 3B. Like the primary current, the secondary current is sampled sixteen times each half cycle which permits the calculation of the average value for waveform 410 and the measurement of the peak amplitude 408.

As previously discussed, the secondary current feedback signal is also supplied to spark detection circuitry 240. Spark detection circuitry 240 continuously monitors the secondary current waveform 410 for a high amplitude narrow spike 412 indicative of a sparking condition. The pulse width of current spike 412 is too narrow to be detected and measured by the 32 samples per cycle sampling rate utilized to measure the feedback signal peak and average values and thus, requires the separate spark detection circuitry 240. As previously described and shown in FIGS. 2A and 2B, spark detection circuitry 240 provides an output signal to main processor 300 on line 246 each time a spark is detected.

Referring now to FIG. 3D, there is shown the secondary voltage $E_s$ whose waveform 430 represents an AC ripple having peak amplitudes 428 and 432 superimposed on a DC value 435. As indicated by DC value 435, the secondary DC voltage is negative with respect to a ground reference potential and has a minimum AC ripple value 428 and a maximum ripple value 432. The sampling system previously described permits the control system 10 to measure both the maximum and minimum peak ripple values 432 and 428 respectively, in addition to computing the average value 435. Comparing FIG. 3D with FIG. 3C, it is evident that the secondary current waveform 410 leads the secondary voltage waveform 430, as would be expected, due to the capacitive loading of the dust precipitator electrodes 80.

Referring now to FIG. 4, there is shown a graphical representation of the secondary voltage, having an AC ripple waveform 440, with respect to the average secondary current. The measurement system utilized by adaptive control system 10, and previously discussed, aids in the ability of control system 10 to detect back ionization and quickly respond at the onset of this condition. It is known that in the back ionization condition, the minimum value of the AC ripple waveform 440 will decrease before the average value of that waveform decreases as the secondary current increases. By detection of the decrease in slope of the minimum AC ripple waveform, represented by the line 450 which intersects the minimum amplitude values 442, 444, 446, and 448, the existence of a back corona can be determined. The existence of back corona can be determined more quickly by comparison of the minimum AC ripple values than if the average value of the secondary voltage were used.

Figure 5:
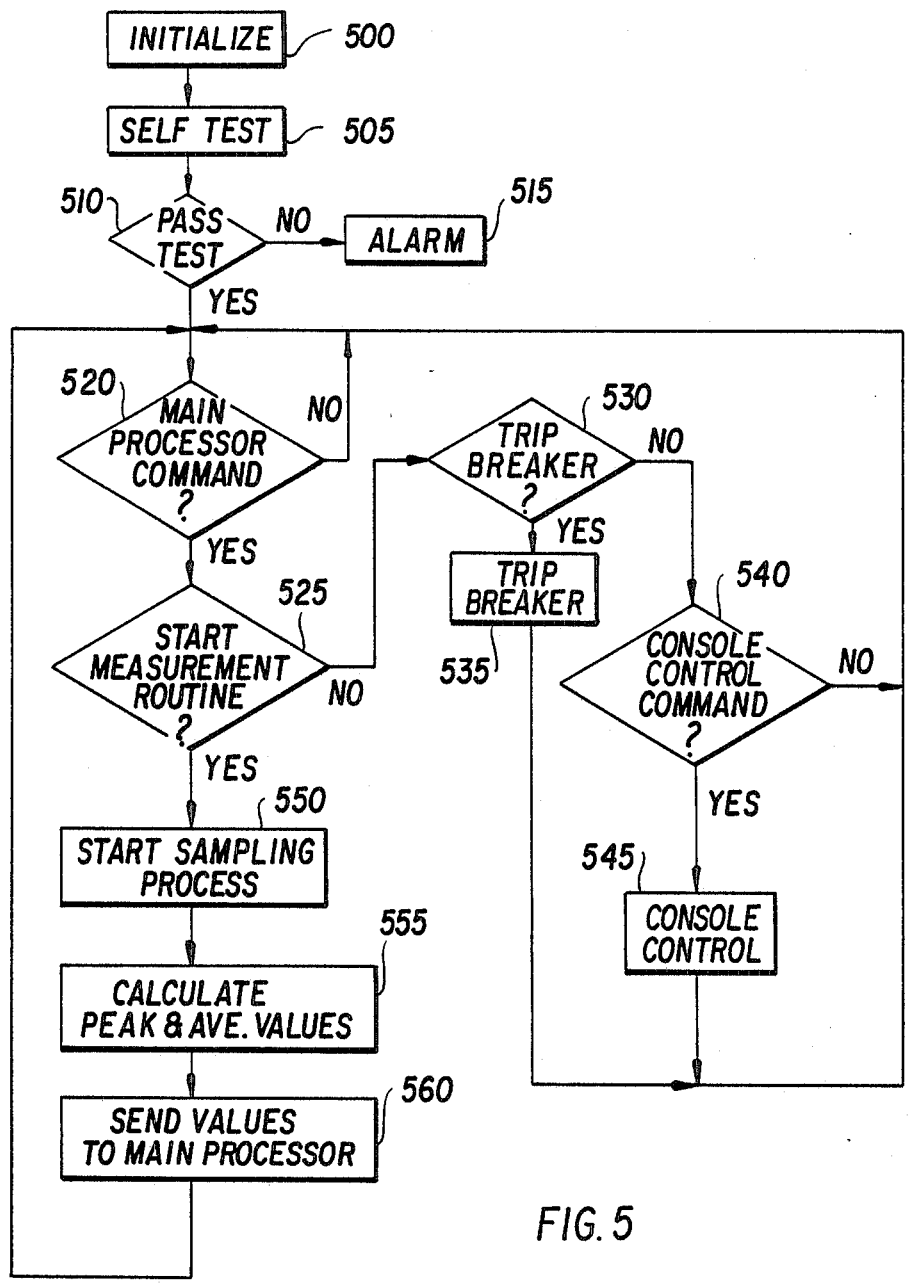
FIG. 5 is a logic flow diagram for the input/output processor of FIG. 2A.

Referring now to FIG. 5, there is shown a software flow diagram for the input/output processor 200, whose sequence of operation, as herein described, is representative of the computer program listing included in the microfiche appendix provided with this Application. When the adaptive control system 10 first powers up, the input/output processor 200 first goes through initialization as indicated by block 500. Program flow then goes to self test block 505, where the input/output processor 200 tests its memory and the peripheral devices connected to it. The flow then passes to decision block 510 to determine the status of the self test. If the test failed, the flow passes to alarm block 515 which causes a test fail annunciator to be operated. If the self test is successful, flow passes to decision block 520 to determine if a command from the main processor has been received. If a command has not been received, then the program loops continuously through decision block 520 until a command is received. Command from the main processor will be to either start the measurement routine, trip the circuit breaker, or turn the console on or off. Decision blocks 525, 530 and 540 determine which of the three possible commands has been received. Thus, once a command is received, flow passes to decision element 525 to determine whether a start measurement command has been received. If the command received is not a start measurement command, then flow passes to decision element 530 to determine if the trip breaker command was sent. If the trip breaker command was received, flow passes to block 535 which represents the trip breaker signal being transmitted from input/output processor 200 to trip interface 278 for transmission to contactor 30. If the trip breaker command was not received, then flow passes to decision element 540 to test if the console control command has been received. If the console control command has been received, flow passes to block 545 for generation of the console on/off control signals.

Following processing of the trip breaker command in block 535 or the console control command in block 545, flow then returns to the decision block for testing receipt of another main processor command at decision element 520. If the start measurement routine and command was received, flow would pass from decision block 525 to the start sampling process block 550. At this point, the input/output processor 200 instructs the multiplexer to start cycling through the various feedback signals. Program then flows to block 555 where the peak and average values of the sampled signals are made. Flow then passes to block 560 where the calculated peak and average values along with the true RMS values obtained from the input hardware is transmitted to the main processor 300. From block 560, flow returns to decision block 520 to again test for a new main processor command.

Figure 6A:
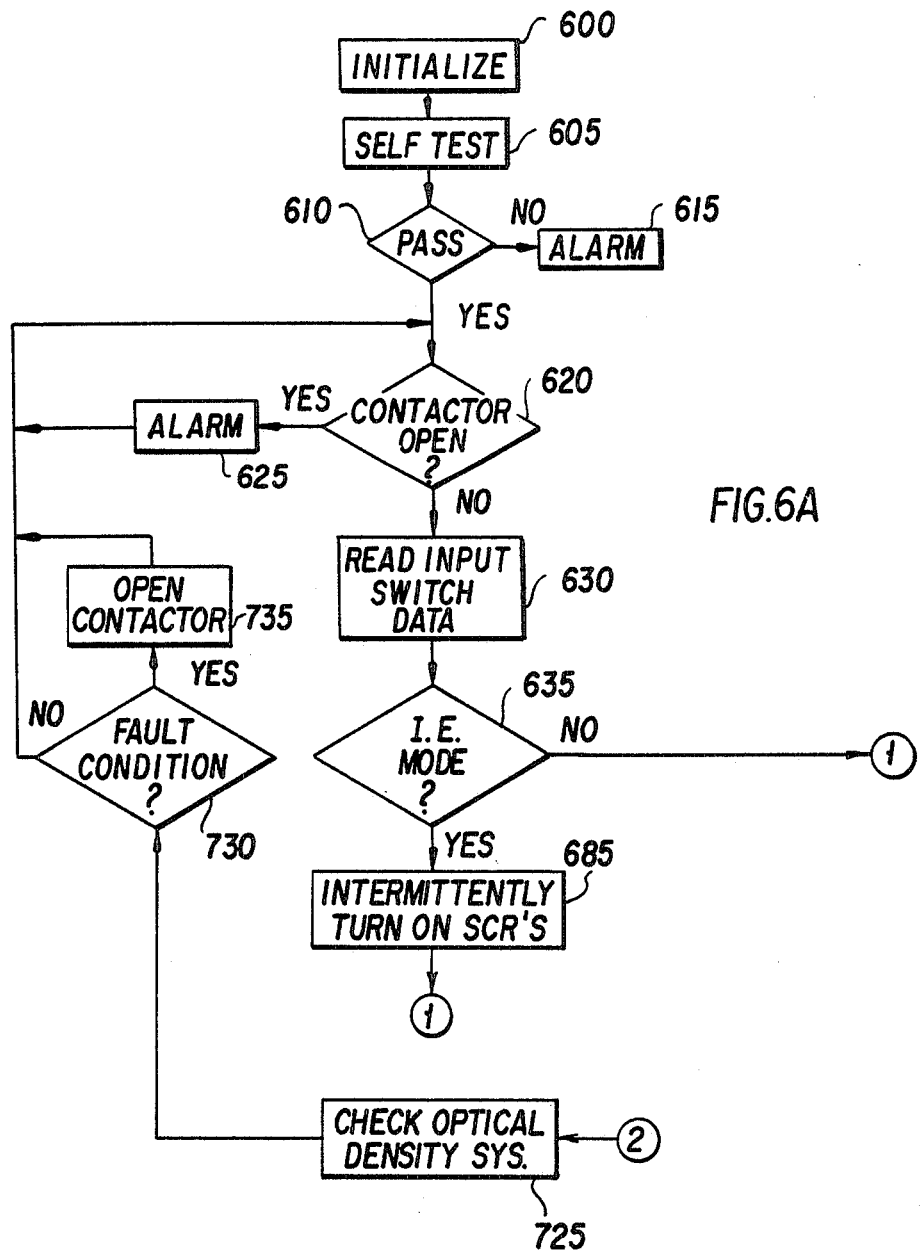
FIGS. 6A, 6B, and 6C are logic flow diagrams for the main processor shown in FIG. 2B.
Figure 6B:
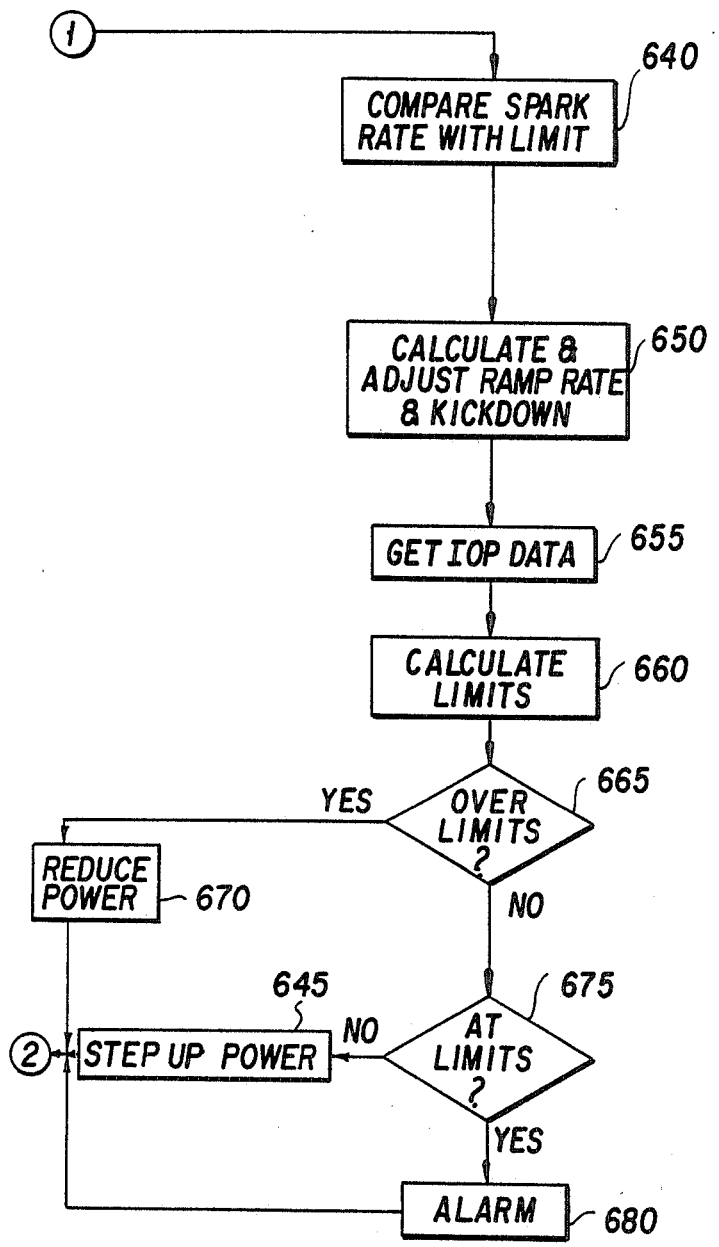
Figure 6C:
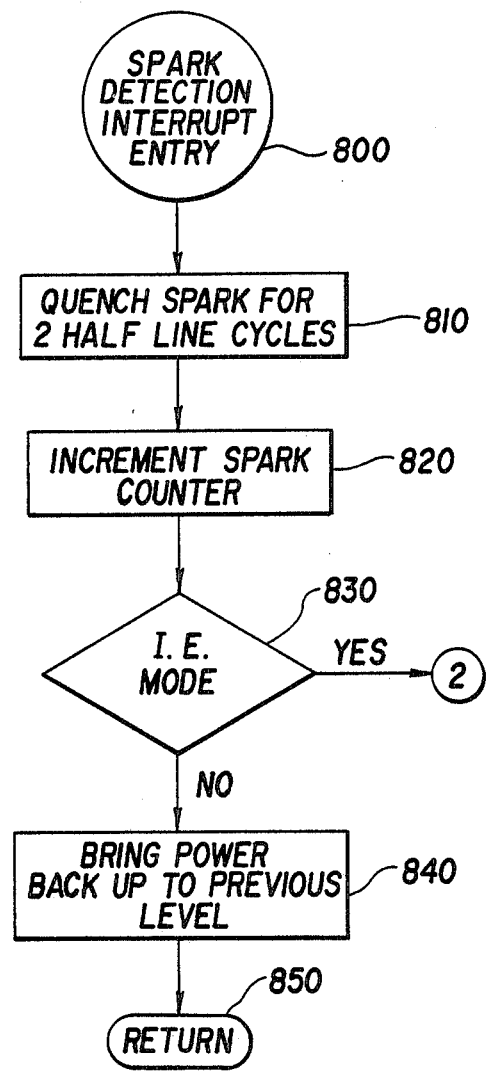

Referring now to FIGS. 6A, 6B, and 6C, there are shown software flow diagrams for main processor 300 which operates concurrently with the input/output processor software previously described. These software flow diagrams as will be described in following paragraphs, are representative of the computer program listing included in the microfiche appendix provided with this Application. As indicated in block 600 of FIG. 6A, the processor goes through initialization when the system first powers up. The flow then passes to self test block 605, where like the input/output processor 200, a series of operational tests are performed on the peripheral devices coupled to main processor 300 and certain pre-selected functions of the main processor 300 itself. Following self test, the flow passes to decision block 610 to determine the outcome of the self test function. If the self test was failed, then flow passes to block 615 for annunciation of a test fail alarm. If the self test was passed, flow passes to decision element 620 where it is determined whether the contactor 30 is open or closed. If the circuit breaker 30 is open, then flow passes to block 625 where an alarm in the form of an indicator light being illuminated to indicate the OPEN condition of the contactor 30. If the contactor was opened due to a fault condition, then the nature of fault is displayed on LCD display 324 shown in FIG. 2B. The program remains in this loop until the condition is cleared and the contactor is closed. If the contactor is closed, flow passes from decision element 620 to block 630 where the manual switch settings are read. Flow then passes to decision element 635 where it is determined whether the continuous or intermittent energization mode has been selected. If the continuous mode has been selected, then flow passes through connection 1, to block 640, shown in FIG. 6B, where the actual spark rate is compared with the limit set with the input switches. Referring further to FIG. 6B, it can be seen that flow continues to block 650 where the ramp rate and kickdown voltage levels are calculated and adjusted. The program flow then goes to block 655 where the measurement data is obtained from the input/output processor 200. When the measurement data is received, flow passes to block 660 where the measurement data is used to calculate the appropriate limits for the operating system parameters. From block 660, flow passes to decision element 665 where the measurement data is tested to determine whether it is over the limits or not. If it is over the limits, flow passes to block 670 where power is reduced, if it is not over the limits, flow passes to decision element 675 for determination if any of the parameters are at the calculated limits. If any of the parameters are at a calculated limit, flow passes to block 680 where an alarm condition is set, if all of the parameters are below the limits, then flow passes to block 645 where the power to the precipitator electrodes is increased. From blocks 645, 670 and 680, flow passes to block 725, in FIG. 6A, through connector 2, where a check is made for commands from the optical density system 90. From block 725, flow passes to decision element 730 where a test is made to determine if a fault condition exists. If a fault condition does exist, flow passes to block 735 where the contactor 30 is opened. After contactor 30 has been opened, flow passes back to decision element 620 as does the flow if the fault condition is not found in decision element 730.

Referring back to FIG. 6A, if the intermittent energization mode was selected, then flow from decision block 635 would pass to block 685 where the power to the dust precipitator electrodes is intermittently turned "ON". Flow then passes to block 640 of FIG. 6B and thus repeats the cycle previously described for the continuous energization mode.

Referring now to FIG. 6C, there is shown a flow diagram for the spark detection interrupt service routine, used by main processor 300 as part of its software operating system. Entry point 800 is entered upon receipt of a spark detection interrupt from the spark detection circuitry previously described. Flow passes from entry point 800 to block 810 where the SCRs are turned off for two half line cycles in order to quench the spark. Flow then passes to block 820 where the spark counter is incremented, the spark rate counter provides the current spark rate to block 640 of FIG. 6B for comparison with the spark rate limit previously set. From block 820 flow passes to decision element 830 for determination of the operating mode. If the system is in the intermittent energization mode, then flow passes to block 725, shown in FIG. 6A, through connector 2. If, on the other hand, the system is in the continuous energization mode, then flow passes to block 840 where the SCRs are turned back ON and the power level is brought back up to levels calculated in block 650 of FIG. 6B to a level at which the system had operated prior to detection of the spark. Subsequently, the flow passes to return block 850 which transfers program control back to the main program at the point which was exited at the time of the interrupt.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. An electrostatic dust collection system including dual processor control for adaptively controlling operating parameters of said electrostatic dust collection system responsive to varying system conditions, comprising:
   (a) first processor means for managing a plurality of input and output signals to achieve a substantially high speed response to said varying system conditions, said first processor means including:
   a high speed data link;
   data gathering means for sequentially sampling predetermined parameters of said varying system conditions responsive to a timing signal;
       input/output control means coupled to said data gathering means for (1) establishing said timing signal, (2) establishing measurements of said varying system conditions from said sampled parameters, (3) transmitting said measurements on said high speed data link, and (4) establishing said output signals responsive to said measurements; and
       output interface means coupled to said input/output control means for communication of said output signals with said electrostatic dust collection system;
   (b) second processor means for establishing said adaptive control of said electrostatic dust collection system responsive to said high speed data link of said first processor means; and,
   (c) monitor and control means coupled to said second processor means for display of said system conditions and providing a means for manual control of said system.

2. The electrostatic dust collection system as recited in claim 1 where said second processor means includes first memory means for storage of said operating parameters, said operating parameters having predetermined values.

3. The electrostatic dust collection system as recited in claim 2 where said second processor means includes second memory means for storing said adaptive control operating parameters.

4. The electrostatic dust collection system as recited in claim 3 where said second processor means further includes microprocessor means coupled to both of said first and second memory means for (1) establishing said adaptive control operating parameters, and (2) establishing a substantially high speed response to overload conditions.

5. The electrostatic dust collection system as recited in claim 4 where said second processor means further includes serial interface means coupled to said microprocessor means for communication with (1) said first processor means, and (2) remote ancillary terminal devices.

6. The electrostatic dust collection system as recited in claim 4 where said microprocessor means compares said predetermined values of said operating parameters stored in said first memory means with values computed to substantially improve system performance, said comparison establishing said adaptive control operating parameters.

7. The electrostatic dust collection system as recited in claim 6 where said second memory means is an alterable non-volatile memory.

8. The electrostatic dust collection system as recited in claim 7 where said microprocessor means establishes said operating parameters of said system from said second memory means subsequent to reinitialization of said system.

9. The electrostatic dust collection system as recited in claim 1 where said data gathering means includes at least one true RMS to DC converter adapted for establishing a DC value responsive to a nonsymmetrical AC signal in a time period having an approximating range of 8.0 to 9.0 milliseconds.

10. An electrostatic dust collection system having an automated control mode for adjusting system parameters responsive to feedback signals from said system, comprising:
    (a) console means for selecting either a manual mode or said automated control mode, said console means having means for displaying measurements of said feedback signals in either of said manual or said automated control modes;
    (b) main processor means coupled to said console means for monitoring said measurements of said feedback signals and controlling said system parameters responsive to said feedback signal measurements, said main processor means including a means to learn new system parameters responsive to said measurements of said feedback signals being outside heretofore established limits; and,
    (c) input/output means coupled to said main processor means for making said measurements of said feedback signals from said system.

11. The electrostatic dust collection system as recited in claim 10 where said means to learn new system parameters includes alterable memory means for storing said new system parameters, said alterable memory means being coupled to said main processor means.

12. The electrostatic dust collection system as recited in claim 11 where said alterable memory means is an electrically alterable non-volatile memory circuit.

13. The electrostatic dust collection system as recited in claim 11 where said main processor means includes first memory means coupled to said main processor means for storing said established limits of said operating parameters.

14. The electrostatic dust collection system as recited in claim 13 where said main processor means further includes microprocessor means coupled to (1) said input/output means, (2) said console means, (3) said first memory means and, (4) said alterable memory means for establishing said new system parameters, and establishing a substantially high speed response to overload conditions.

15. The electrostatic dust collection system as recited in claim 14 where said microprocessor means compares said established limits of said operating parameters stored in said first memory means with values computed to substantially improve system performance, said comparison establishing said new system parameters.

16. The electrostatic dust collection system as recited in claim 14 where said input/output means includes I/O processor means coupled to said main processor means for (1) establishing a timing signal, (2) establishing measurements of said feedback signals, (3) establishing output signals responsive to said measurements, and (4) transmitting said measurements to said main processor means.

17. The electrostatic dust collection system as recited in claim 16 where said input/output means further includes interface means coupled to said I/O processor means and said microprocessor means for (1) coupling said feedback signals to said I/O processor means responsive to said timing signal, (2) coupling said output signals from said I/O processor means to said electrostatic dust collection system, and (3) coupling said system parameters from said microprocessor means to said electrostatic dust collection system.

18. The electrostatic dust collection system as recited in claim 17 where said interface means includes at least one true RMS to DC converter adapted for establishing a DC value responsive to one of said feedback signals in a time period having an approximating value of 8.3 milliseconds, said feedback signal being a non-symmetrical AC signal.

19. The electrostatic dust collection system as recited in claim 16 where said I/O processor means includes a high speed data link for said transmission of said measurements to said main processor means.

20. The electrostatic dust collection system as recited in claim 19 where said main processor means further includes serial interface means coupled to said microprocessor means and said high speed data link for the substantially high speed transfer of said measurements of said feedback signals.

21. An electrostatic dust collection system including an adaptive control for substantially maximizing performance of said electrostatic dust collection system by altering said systems heretobefore predetermined operating parameters responsive to a plurality of feedback signals, comprising:
    (a) signal processing means for performing substantially high speed measurements of predetermined signal parameters on each of said feedback signals, said predetermined signal parameters being representative of said system performance; and,
    (b) system management means coupled to said signal processing means for establishing adaptive control signals responsive to said feedback signal parameters measured by said signal processing means, said signal processing means including:
      I/O processor means coupled to said system management means for (1) establishing said substantial high speed measurements of said predetermined signal parameters on each of said feedback signals, (2) transmitting said measurements to said system management means, and (3) establishing output signals responsive to said measurements;
      interface means coupled to said I/O processor means for (1) sequentially sampling said feedback signals, (2) coupling said output signals from said I/O processor means to said electrostatic dust collection system, and (3) coupling said adaptive control signals from said system management means to said electrostatic dust collection system.

22. The electrostatic dust collection system as recited in claim 21 where said interface means includes at least one true RMS to DC converter adapted for establishing a DC value responsive to one of said plurality of feedback signals in a time period having an approximating value of 8.3 milliseconds, said feedback signal being a non-symmetrical AC signal.

23. The electrostatic dust collection system as recited in claim 21 where said I/O processor includes a high speed data link for said transmission of said measurements to said system management system.

24. The electrostatic dust collection system as recited in claim 23 where said system management means includes a serial interface means coupled to said high speed data link for said transmission of said measurements to said system management system.

25. The electrostatic dust collection system as recited in claim 24 where said system management means includes microprocessor means coupled to said serial interface means for (1) establishing said adaptive control signals and (2) establishing a substantially high speed response to overload conditions.

26. The electrostatic dust collection system as recited in claim 25 where said substantially high speed response to said overload conditions occurs within an approximating range of 9.0 to 17.0 milliseconds.

27. The electrostatic dust collection system as recited in claim 25 where said microprocessor means includes first memory means for storing said predetermined operating parameters.

28. The electrostatic dust collection system as recited in claim 27 where said microprocessor means includes second memory means for storing adaptive control operating parameters, said adaptive control parameters establishing said adaptive control signals.

29. The electrostatic, dust collection system as recited in claim 28 where said microprocessor means compares the values of said predetermined operating parameters stored in said first memory means with values computed to substantially improve system performance, said comparison establishing said adaptive control operating parameters stored in said second memory means.

30. The electrostatic dust collection system as recited in claim 28 where said first memory means is a non-volatile memory.

31. The electrostatic dust collection system as recited in claim 28 where said second memory means is an electrically alterable non-volatile memory.

* * * * *